US009503839B2

(12) United States Patent
Jose et al.

(10) Patent No.: US 9,503,839 B2
(45) Date of Patent: Nov. 22, 2016

(54) DSRC LISTEN MODE FOR WI-FI USING DSRC SPECTRUM

(71) Applicant: QUALCOMM Incorporated, San Diego, CA (US)

(72) Inventors: Jubin Jose, Bound Brook, NJ (US); Ying Wang, Easton, PA (US); Kai Shi, San Jose, CA (US); Xinzhou Wu, Hillsborough, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/286,565

(22) Filed: May 23, 2014

(65) Prior Publication Data

US 2014/0357193 A1 Dec. 4, 2014

Related U.S. Application Data

(60) Provisional application No. 61/829,490, filed on May 31, 2013.

(51) Int. Cl.
| | |
|---|---|
| *H04W 72/00* | (2009.01) |
| *H04W 4/00* | (2009.01) |
| *H04W 88/06* | (2009.01) |
| *H04W 72/02* | (2009.01) |
| *H04W 48/16* | (2009.01) |
| *H04W 16/14* | (2009.01) |

(52) U.S. Cl.
CPC ............ *H04W 4/008* (2013.01); *H04W 72/02* (2013.01); *H04W 88/06* (2013.01); *H04W 16/14* (2013.01); *H04W 48/16* (2013.01); *H04W 72/00* (2013.01)

(58) Field of Classification Search
CPC ................. H04W 72/1226; H04W 72/1231
USPC ...................... 455/41.1, 41.2, 41.3
See application file for complete search history.

(56) References Cited

U.S. PATENT DOCUMENTS

| | | | |
|---|---|---|---|
| 7,062,239 B2 | 6/2006 | Inoue | |
| 7,940,794 B2 * | 5/2011 | Zhang et al. | 370/468 |
| 8,116,959 B2 | 2/2012 | Laberteaux et al. | |
| 8,274,405 B2 | 9/2012 | Bos | |
| 9,019,915 B2 * | 4/2015 | Stephens et al. | 370/329 |
| 2007/0132515 A1 | 6/2007 | Lee et al. | |
| 2007/0298810 A1 * | 12/2007 | Kasher et al. | 455/452.1 |
| 2009/0023040 A1 * | 1/2009 | Paik et al. | 429/34 |
| 2009/0023404 A1 | 1/2009 | Leinonen et al. | |
| 2009/0298435 A1 * | 12/2009 | Lee et al. | 455/63.1 |

(Continued)

OTHER PUBLICATIONS

ISA/EPO, International Search Report and Written Opinion of the International Searching Authority, Int'l App. No. PCT/US2014/039512, Sep. 15, 2014, European Patent Office, Rijswijk, NL 9 pgs.

(Continued)

*Primary Examiner* — Wen Huang
(74) *Attorney, Agent, or Firm* — Holland & Hart LLP

(57) ABSTRACT

Methods, systems, and devices are described for detecting dedicated short range communications (DSRC) transmissions to determine whether to use at least a portion of the DSRC spectrum. In one embodiment, a multi-mode device may be operated outside of the DSRC spectrum using a first clock rate, and may then be switched to a second clock rate while operating outside of the DSRC spectrum to detect DSRC transmissions using the DSRC spectrum.

30 Claims, 11 Drawing Sheets

(56) References Cited

U.S. PATENT DOCUMENTS

| | | | |
|---|---|---|---|
| 2011/0021233 A1* | 1/2011 | Tsuboi et al. | 455/513 |
| 2011/0096863 A1* | 4/2011 | Lee et al. | 375/295 |
| 2012/0069746 A1* | 3/2012 | Park | 370/252 |
| 2012/0082040 A1* | 4/2012 | Gong et al. | 370/252 |
| 2012/0157151 A1* | 6/2012 | Chu et al. | 455/522 |
| 2012/0214464 A1* | 8/2012 | Xhafa et al. | 455/418 |
| 2013/0103779 A1 | 4/2013 | Bai et al. | |
| 2013/0195018 A1* | 8/2013 | Lv et al. | 370/328 |
| 2014/0335884 A1* | 11/2014 | Jose et al. | 455/456.1 |
| 2015/0117186 A1* | 4/2015 | Uchida | 370/230 |

OTHER PUBLICATIONS

IPEA/EPO, Second Written Opinion of the International Preliminary Examining Authority, Int'l App. No. PCT/US2014/039512, May 6, 2015, European Patent Office, Rijswijk, NL 4 pgs.

* cited by examiner

DSRC LISTEN MODE FOR WI-FI USING DSRC SPECTRUM

CROSS REFERENCES

The present application for patent claims priority to U.S. Provisional Patent Application No. 61/829,490 by Jose et al., entitled "DSRC Listen Mode for Wi-Fi Using DSRC Spectrum," filed May 31, 2013, assigned to the assignee hereof.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. The available bandwidth for transmissions affects the data rate and throughput of the transmissions. As the bandwidth increases, the data rate may also increase.

Multi-mode devices that communicate on cellular and Wi-Fi networks may desire to use an increased amount of bandwidth for their transmissions. The bandwidth allocated to devices operating in the DSRC spectrum is typically used for DSRC-related transmissions. If a multi-mode device expands its bandwidth using the DSRC spectrum, it may cause interference to these DSRC-related transmissions. Thus, techniques to minimize interference to DSRC-related transmissions are desired when the DSRC spectrum is shared with devices performing non-DSRC transmissions.

SUMMARY

The described features generally relate to one or more improved methods, systems, and/or apparatuses for detecting dedicated short range communications (DSRC) transmissions to determine whether to use at least a portion of the DSRC spectrum.

A method for detecting DSRC transmissions to determine whether to use at least a portion of the DSRC spectrum is described. In one configuration, a multi-mode device may be operated outside of the DSRC spectrum using a first clock rate, and may then be switched to a second clock rate while operating outside of the DSRC spectrum to detect DSRC transmissions using the DSRC spectrum.

In some embodiments, a method for detecting dedicated short range communications (DSRC) transmissions to determine whether to use at least a portion of the DSRC spectrum including operating, by a multi-mode device, outside of the DSRC spectrum using a first clock rate, and switching to a second clock rate while operating outside of the DSRC spectrum to detect DSRC transmissions using the DSRC spectrum.

In some embodiments, a multi-mode device for detecting dedicated short range communications (DSRC) transmissions to determine whether to use at least a portion of the DSRC spectrum including a processor, memory in electronic communication with the processor, and instructions stored in the memory. The instructions may be executable by the processor to operate the multi-mode device outside of the DSRC spectrum using a first clock rate, and switch to a second clock rate while operating outside of the DSRC spectrum to detect DSRC transmissions using the DSRC spectrum.

In some embodiments, a multi-mode device for detecting dedicated short range communications (DSRC) transmissions to determine whether to use at least a portion of the DSRC spectrum including means for operating the multi-mode device outside of the DSRC spectrum using a first clock rate, and means for switching to a second clock rate while operating outside of the DSRC spectrum to detect DSRC transmissions using the DSRC spectrum.

In some embodiments, a computer-program product for detecting dedicated short range communications (DSRC) transmissions to determine whether to use at least a portion of the DSRC spectrum includes a non-transitory computer-readable medium storing instructions executable by a processor to operate a multi-mode device outside of the DSRC spectrum using a first clock rate, and switch to a second clock rate while operating outside of the DSRC spectrum to detect DSRC transmissions using the DSRC spectrum.

Various embodiments of the method, device, and/or computer program products may include the features of, means for, and/or processor-executable instructions for determining whether the detected DSRC transmissions exceed a threshold.

Various embodiments of the method, device, and/or computer program products may include the features of, means for, and/or processor-executable instructions for upon determining that the detected DSRC transmissions fails to exceed the threshold, switching to the first clock rate, and operating in at least a portion of the DSRC spectrum.

Various embodiments of the method, device, and/or computer program products may include the features of, means for, and/or processor-executable instructions for upon determining that the detected DSRC transmissions exceed the threshold, switching to the first clock rate, and continuing to operate outside of the DSRC spectrum for a predetermined period of time.

Various embodiments of the method, device, and/or computer program products may include the features of, means for, and/or processor-executable instructions for operating at the second clock rate for a predetermined period of time, and upon an expiration of the predetermined period of time, switching to the first clock rate.

Various embodiments of the method, device, and/or computer program products may include the features of, means for, and/or processor-executable instructions for reporting an occurrence of one or more detected DSRC transmissions to an access point (AP), receiving instructions from the AP, the instructions based at least in part on the reported occurrences of the DSRC transmissions, and operating in at least a portion of the DSRC spectrum based at least in part on the instructions received from the AP.

Various embodiments of the method, device, and/or computer program products may include the features of, means for, and/or processor-executable instructions for monitoring at least one of a plurality of frequency bands within the DSTC spectrum while operating at the second clock rate.

Various embodiments of the method, device, and/or computer program products may include the features of, means for, and/or processor-executable instructions for determining an activity level of transmissions on each of the monitored frequency bands.

Various embodiments of the method, device, and/or computer program products may include the features of, means for, and/or processor-executable instructions for switching to the first clock rate, selecting at least one of the monitored frequency bands, and operating in the DSRC spectrum using the at least one selected frequency band, the frequency band being selected based at least in part on the determined activity level. In some cases, selecting at least one of the monitored frequency bands includes avoiding the selection of frequency bands allocated for safety-related transmissions in the DSRC spectrum. The second clock rate may be half the first clock rate.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Information and data may be transferred more quickly and efficiently based on the amount of available bandwidth. The size of the bandwidth (e.g., the width) may be the difference between the highest frequency and the lowest frequency in a continuous range of frequencies (typically measured in Hertz, for example). Often, the data rate limit (e.g., channel capacity, amount of information that can be transferred) is proportional to the size of the bandwidth. For example, 80 MHz of bandwidth will have a higher data rate limit than 40 MHz of bandwidth. As a result, in order to support higher data rates, more bandwidth may be required. Bandwidth occupies at least a portion of a spectrum (e.g., radio spectrum). As a result, an increase in bandwidth requires an increase in spectrum. However, additional spectrum may be difficult to obtain.

In most cases, spectrum use is regulated (e.g., allocated). For example, in the United States, spectrum use is regulated by the Federal Communications Commission (FCC). In the United States, the FCC has allocated the 5.15-5.25 GHz (e.g., U-NII 1), 5.25-5.35 GHz (e.g., U-NII 2), 5.47-5.725 GHz (e.g., U-NII WW), and 5.725-5.825 GHz (e.g., U-NII 3) frequency bands as Unlicensed National Infrastructure (U-NII) spectrum and the 5.85-5.925 GHz frequency band as dedicated short range communication (DSRC) spectrum. Thus, bandwidth may be constrained to the space allotted in the allocated spectrum. As a result, it may not be possible to increase the available bandwidth (or the data rate limit, for example) due to the finite constraints of the allocated spectrum. As will be discussed below, spectrum sharing may be used to increase the available bandwidth.

In one example, the systems and methods described herein may enable multi-mode devices that operate in the U-NII spectrum band to opportunistically use the DSRC spectrum band to increase bandwidth. For instance, the systems and methods described herein may enable U-NII users (e.g., unlicensed Wi-Fi users) to detect the existence of DSRC devices in the DSRC spectrum and share the neighboring DSRC spectrum in an undisruptive manner as secondary users. In some configurations, the multi-mode devices may take measures to reduce or eliminate interference to DSRC devices.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
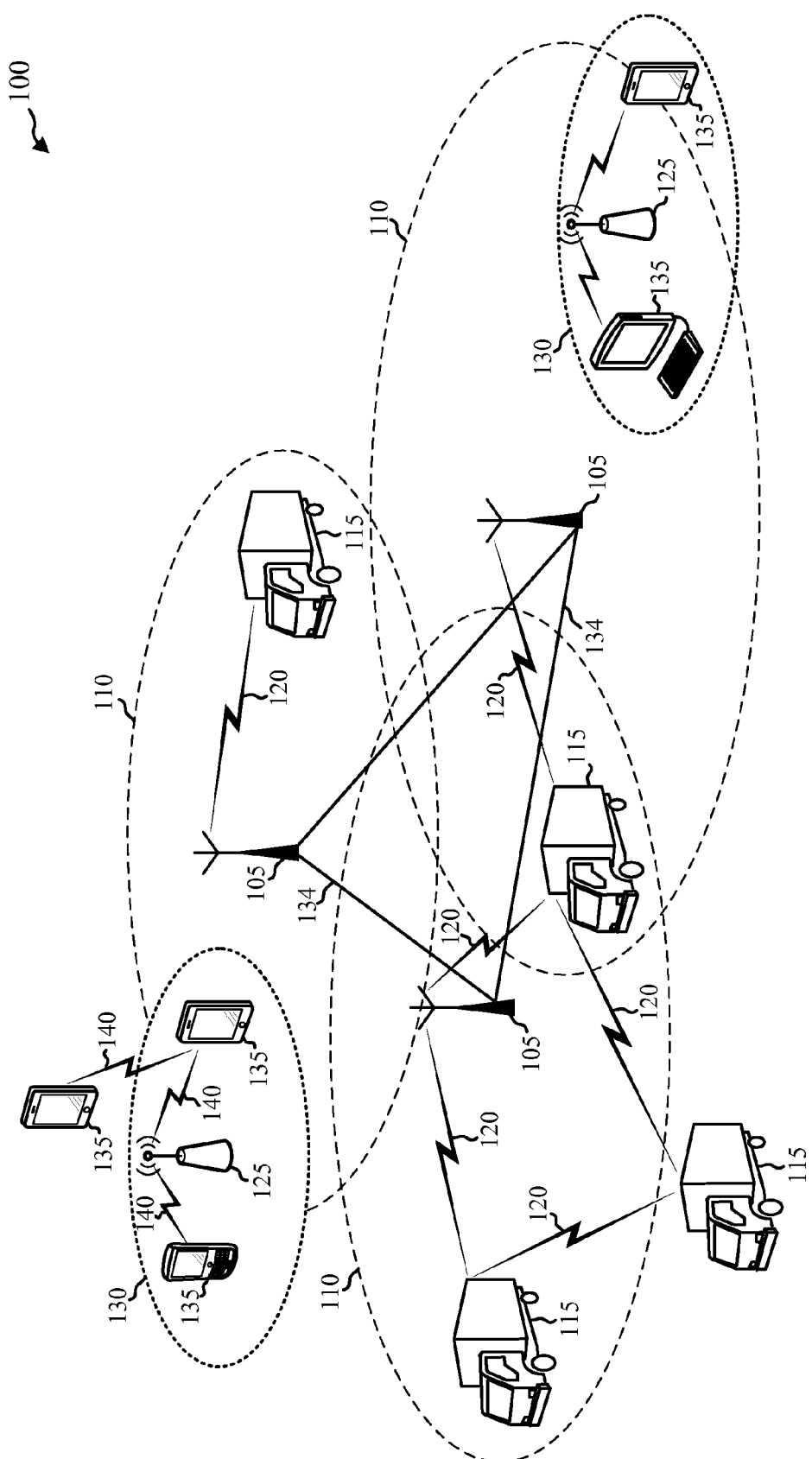
FIG. 1 shows a block diagram of a wireless communications system.

Referring first to FIG. 1, a diagram illustrates an example of a wireless communications system 100. The system 100 includes DSRC base stations 105 and DSRC devices 115 operating within the DSRC spectrum (in a DSRC communications system, for example). The system 100 also includes communication base stations 125 and communication devices 135 operating outside of the DSRC spectrum. In one example, the communication base stations 125 and the communication devices 135 may operate in the U-NII spectrum (in a Wi-Fi communication system, for example).

The FCC initially allocated the DSRC spectrum for automotive use (e.g., intelligent transportation systems). Examples of DSRC communications include emergency warnings for vehicles, cooperative adaptive cruise control, cooperative collision warning, intersection collision avoidance, electronic parking payments, in vehicle signaling, electronic toll collection, etc. DSRC communication links 120 may be between a DSRC device 115 and a DSRC base station 105 or between a DSRC device 115 and another DSRC device 115. In some cases, DSRC communication links 120 between DSRC devices 115 may occur outside of the coverage area 110 of the DSRC base station 105. In some embodiments, the DSRC base stations 105 may communicate, either directly or indirectly, with each other over backhaul links 134, which may be wired or wireless communication links.

The DSRC devices 115 may be dispersed throughout the wireless communications system 100, and each DSRC device 115 may be stationary or mobile. A DSRC device 115 may be a vehicle, traffic signal, railroad crossing, base station, cellular phone, a personal digital assistant (PDA), or the like. A DSRC device 115 may be able to communicate with the DSRC base station 105 and other DSRC devices 115. Each DSRC base station 105 may provide communication coverage for a respective DSRC geographical coverage area 110.

Multi-mode devices (also referred to as communication devices) 135 may also be dispersed through the wireless communications system 100. Each device 135 may be stationary or mobile. A device 135 may also be referred to by those skilled in the art as a Wi-Fi device, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A multi-mode device 135 may be a Wi-Fi device attempting to operate within the DSRC. The device 135 may also be a cellular phone, a personal digital assistant (PDA), a wireless modem, a wireless communication device, a handheld device, a tablet computer, a laptop computer, a cordless phone, a wireless local loop (WLL) station, or the like.

A communication device 135 may be able to communicate with communication base stations 125 and/or other communication devices 135. Each of the communication base station 125 sites may provide communication coverage for a respective communications geographic coverage area 130. Communication links 140 may provide communications between a communication device 135 and a communication base station 125 and/or a communication device 135. In some embodiments, communication base stations 125 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 130 for a communication base station 125 may be divided into sectors making up only a portion of the coverage area (not shown).

The wireless communications system 100 may also support operation on multiple carriers (waveform signals of different frequencies). Multi-carrier transmitters can transmit modulated signals simultaneously on the multiple carriers. For example, each communication link 140 (and DSRC communication link 120, for example) may be a multi-carrier signal modulated according to the various radio technologies. Each modulated signal may be sent on a different carrier and may carry control information (e.g., reference signals, control channels, etc.), overhead information, data, etc.

As is shown in FIG. 1, the coverage area 130 of communication base stations 125 may overlap with the coverage areas 110 of the DSRC base stations 105. In the typical scenario, the overlapping coverage areas (or overlapping use outside of one or more coverage areas, for example) may not result in interference because the DSRC communication system is operating in the DSRC spectrum while the other communications system is operating outside of the DSRC spectrum (in the U-NII spectrum, for example). However, in some embodiments, the systems and methods described herein describe techniques for opportunistic use of the DSRC spectrum by the communication base station 125 and/or the communication devices 135, which could result in interference for the DSRC communication system. In one example, a multi-mode communication device 135 (or simply multi-mode device) may detect an activity level on at least a portion of the DSRC spectrum and may opportunistically use the DSRC spectrum based at least in part on the detected activity level. Additionally or alternatively, the multimode communication device 135 may opportunistically use at least a portion of the DSRC spectrum based on the location of the multimode communication device 135 being outside of a geographical area attributed to DSRC transmissions. Additionally or alternatively, the multimode communication device 135 may adapt an access parameter to provide priority to transmissions using the DSRC spectrum. Additionally or alternatively, the multi-mode communication device 135 may use a first clock rate while operating outside of the DSRC spectrum and may switch to a second clock rate to detect transmissions using the DSRC spectrum.

Figure 2:
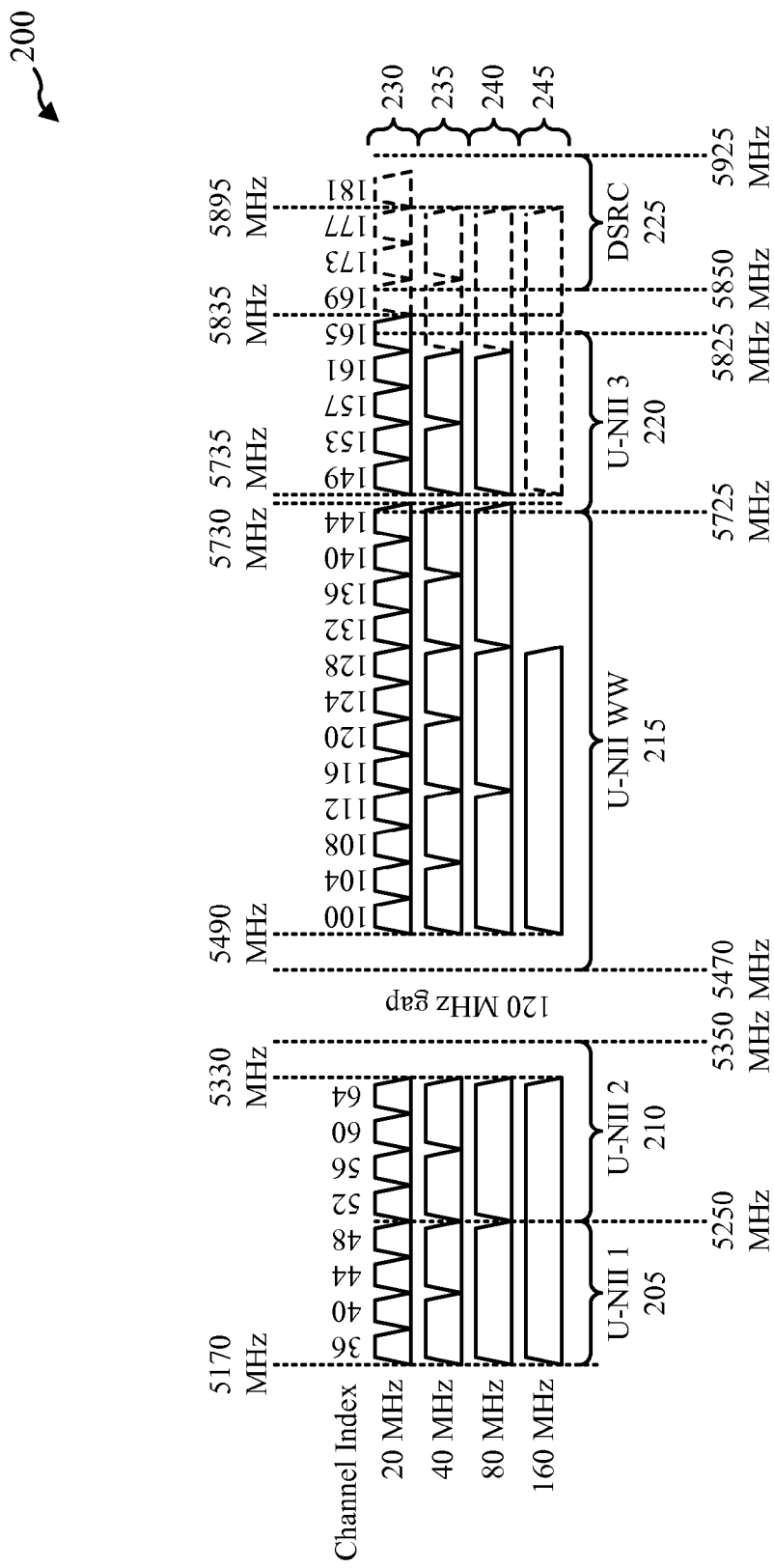
FIG. 2 is a diagram illustrating frequency band allocations along a frequency spectrum.

FIG. 2 shows an exemplary view of the various spectrum allocations in the 5 GHz spectrum 200. As illustrated in FIG. 2, the 5 GHz spectrum 200 includes the U-NII 1 frequency band 205 (e.g., 5170-5250 MHz), the U-NII 2 frequency band 210 (e.g., 5250-5350 MHz), the U-NII WW frequency band 215 (e.g., 5470-5725 MHz), the U-NII 3 frequency band 220 (e.g., 5725-5825 MHz), and the DSRC frequency band 225 (e.g., 5850-5925 MHz).

Each frequency band may be allocated to use one or more channels. Each channel may occupy bandwidth (e.g., 10 MHz, 20 MHz, 40 MHz, 80 MHz, 160 MHz, etc.). As noted above, increased bandwidth may result in higher data rates. As a result, increasing the number of channels and/or increasing the bandwidth of the channels may be desirable. Unfortunately, spectrum allocations may limit the number and/or the size of channels. For example, the U-NII 1 frequency band 205 (which occupies 80 MHz, for example) may support up to four 20 MHz channels 230 (with channel indexes 36, 40, 44, and 48, for example), up to two 40 MHz channels 235, or one 80 MHz channel 240. Similarly, the U-NII 2 frequency band 210 may support up to four 20 MHz channels 230 (with channel indexes 52, 56, 60, and 64, for example), up to two 40 MHz channels 235, or one 80 MHz channel 240. As a result, neither the U-NII 1 frequency band 205 nor the U-NII 2 frequency band 210 by may individually support a 160 MHz channel 245. Certain devices (e.g., Wi-Fi device) may operate across both the U-NII 1 and U-NII 2 frequency bands 205, 210. As a result the U-NII 1 and U-NII 2 frequency bands 205, 210 may effectively be combined to result in a 5170-5350 MHz frequency band. Accordingly, a 160 MHz channel 245 (e.g., 5170-5330 MHz) may be supported.

As illustrated in FIG. 2, the U-NII 3 frequency band 220 (e.g., 5725-5825 MHz) may support up to five 20 MHz channels 230 (with channel indexes 149, 153, 157, 161, and 165, for example), up to two 40 MHz channels 235, or one 80 MHz channel 240. Typically, the DSRC frequency band 225 supports DSRC communications using 10 MHz channels. In some cases, the systems and methods described herein may opportunistically use the DSRC frequency band (as secondary users, for example). In one embodiment, multi-mode devices may use the DSRC spectrum when they are located in an area that is not attributed to DSRC transmissions. As a result, the U-NII 3 and DSRC frequency bands 220, 225 may effectively be combined to result in a 5725-5925 MHz frequency band. Accordingly, the combined frequency bands may support up to nine 20 MHz channels 230 (with channel indexes 149, 153, 157, 161, 165, 169, 173, 177, and 181, for example), up to four 40 MHz channels 235, up to two 80 MHz channels 240, and up to one 160 MHz channel 245. Thus, sharing of the DSRC spectrum may substantially increase the number of the available channels and/or the size of the available channels. In one example, spectrum sharing across the U-NII and DSRC frequency bands may support up to twenty nine 20 MHz channels 230, up to fourteen 40 MHz channels 235, up to seven 80 MHz channel 240, and up to three 160 MHz channels 245. These increases may enable increased data rates (allowing for higher throughput, for example). For instance, the increased data rates may be used to transmit high definition video formats (Ultra High Definition Television (UHDTV), for example).

Figure 3:
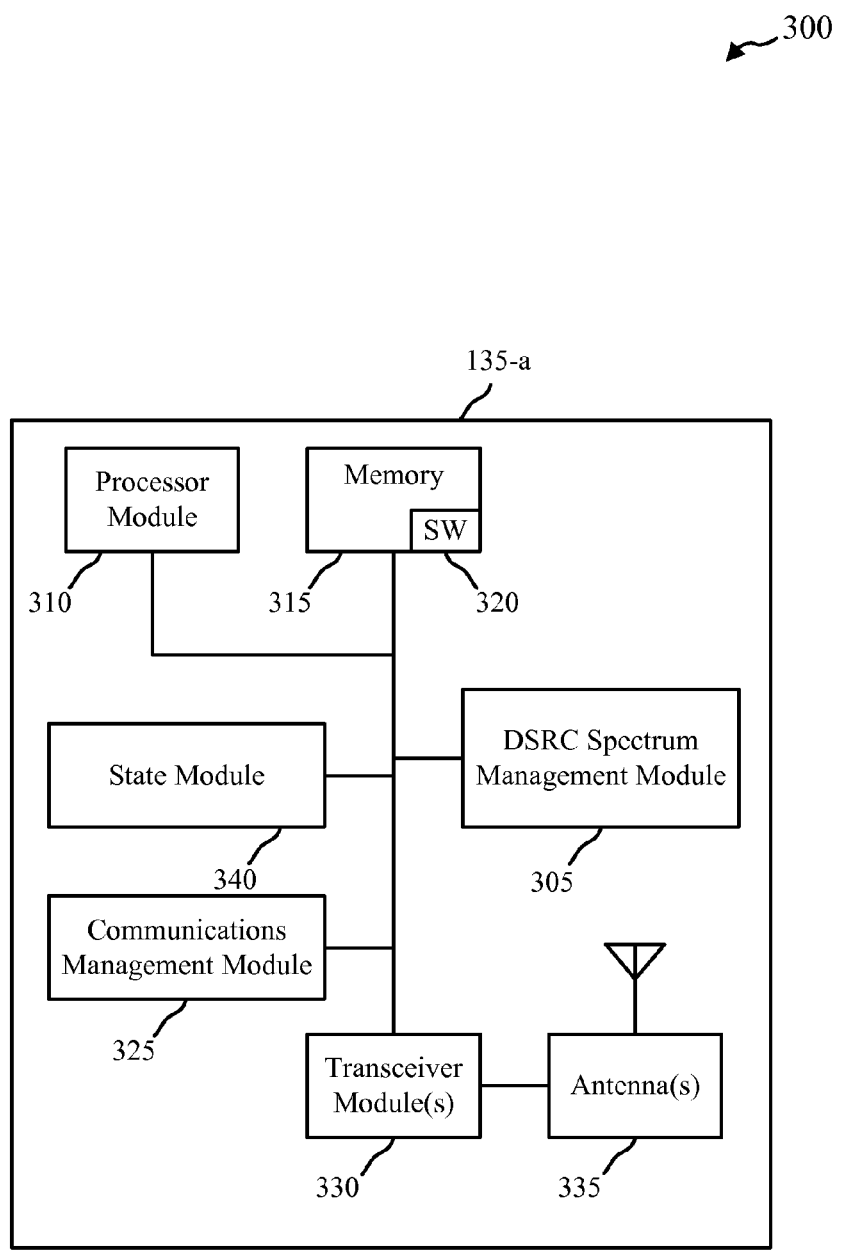
FIG. 3 shows a block diagram illustrating one example of a multi-mode device in accordance with various embodiments.

FIG. 3 is a block diagram 300 of a device 135-*a*. The device 135-*a* may be an example of one or more aspects of the multi-mode devices 135 described with reference to FIG. 1. The device 135-*a* may have any of various configurations, such as that of a Wi-Fi device, a personal computer (e.g., a laptop computer, a netbook computer, a tablet computer, etc.), a cellular telephone, a personal digital assistant (PDA), a digital video recorders (DVR), an internet appliance, a gaming console, an e-reader, etc. The device 135-*a* may have an internal power supply (not shown), such as a small battery, to facilitate mobile operation.

The device 135-*a* may include at least one antenna (antenna(s) 335), at least one transceiver module (transceiver module(s) 330), memory 315, and a processor module 310, which each may be in communication, directly or indirectly, with each other (e.g., via one or more buses). The transceiver module(s) 330 may be configured to communicate bi-directionally, via the antenna(s) 335 and/or one or more wired or wireless links, with one or more networks, as described with reference to FIG. 1. For example, the transceiver module(s) 330 may be configured to communicate bi-directionally with one or more of the access points 125 or other multi-mode devices 135 of FIG. 1. The transceiver module(s) 330 may include at least one modem configured to modulate packets and provide modulated packets to the antenna(s) 335 for transmission, and to demodulate packets received from the antenna(s) 335. While the device 135-*a* may include a single antenna, the device 135-*a* will typically include multiple antennas for multiple links.

The memory 315 may include random access memory (RAM) and/or read-only memory (ROM). The memory 315 may store computer-readable, computer-executable software code 320 containing instructions that are configured to, when executed, cause the processor module 310 to perform various functions described herein (e.g., DSRC spectrum management, etc.). Alternatively, the software code 320 may not be directly executable by the processor module 310 but be configured to cause the device 135-*a* (e.g., when compiled and executed) to perform functions described herein.

The processor module 310 may include an intelligent hardware device, e.g., a central processing unit (CPU), a microcontroller, an application specific integrated circuit (ASIC), etc. The processor module 310 may include a speech encoder (not shown) configured to receive audio via a microphone, convert the audio into packets (e.g., 30 ms in length) representative of the received audio, provide the audio packets to the transceiver module(s) 330, and provide indications of whether a user is speaking. Alternatively, an encoder may only provide packets to the transceiver module(s) 330, with the provision or withholding/suppression of the packet itself providing the indication of whether a user is speaking.

According to the architecture of FIG. 3, the device 135-*a* further includes a communications management module 325 and a state module 340. The communications management module 325 may manage communications with other devices 135. By way of example, the communications management module 325 may be a component of the multi-mode device 135-*a* in communication with some or all of the other components of the multi-mode device 135-*a* via a bus. Alternatively, functionality of the communications management module 325 may be implemented as a component of the transceiver module 330, as a computer program product, and/or as one or more controller elements of the processor module 310. The state module 340 may reflect and control the current device state (e.g., context, authentication, base station association, other connectivity issues).

The device 135-*a* may further include a DSRC spectrum management module 305. By way of example, the DSRC spectrum management module 305 may be a component of the multi-mode device 135-*a* in communication with some or all of the other components of the multi-mode device 135-*a* via a bus. Alternatively, functionality of the DSRC spectrum management module 305 may be implemented as a computer program product, and/or as one or more controller elements of the processor module 310. The spectrum management module 305 may manage the device's detection of DSRC transmissions to determine whether the device 135-*a* may use at least a portion of the DSRC spectrum. For example, the module 305 may switch the device 135-*a* from 1) operation outside of the DSRC spectrum using a first clock rate to 2) operating using a second clock rate. The module 305 may then manage the device's detection of DSRC transmissions using the DSRC spectrum while the device 135-*a* continues to operate outside of the DSRC spectrum. Upon determining that an activity level of the detected DSRC transmissions fails to exceed a threshold, the module 305 may switch the device 135-*a* back to operation using the first clock rate and allow the device 135-*a* to operate within at least a portion of the DSRC spectrum. However, upon determining that an activity level of the detected DSRC transmissions exceeds the threshold, the module 305 may switch the device 135-*a* back to operation using the first clock rate and ensure that the device 135-*a* continues to operate outside of the DSRC spectrum.

The components of the device 135-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 135-a.

Figure 4:
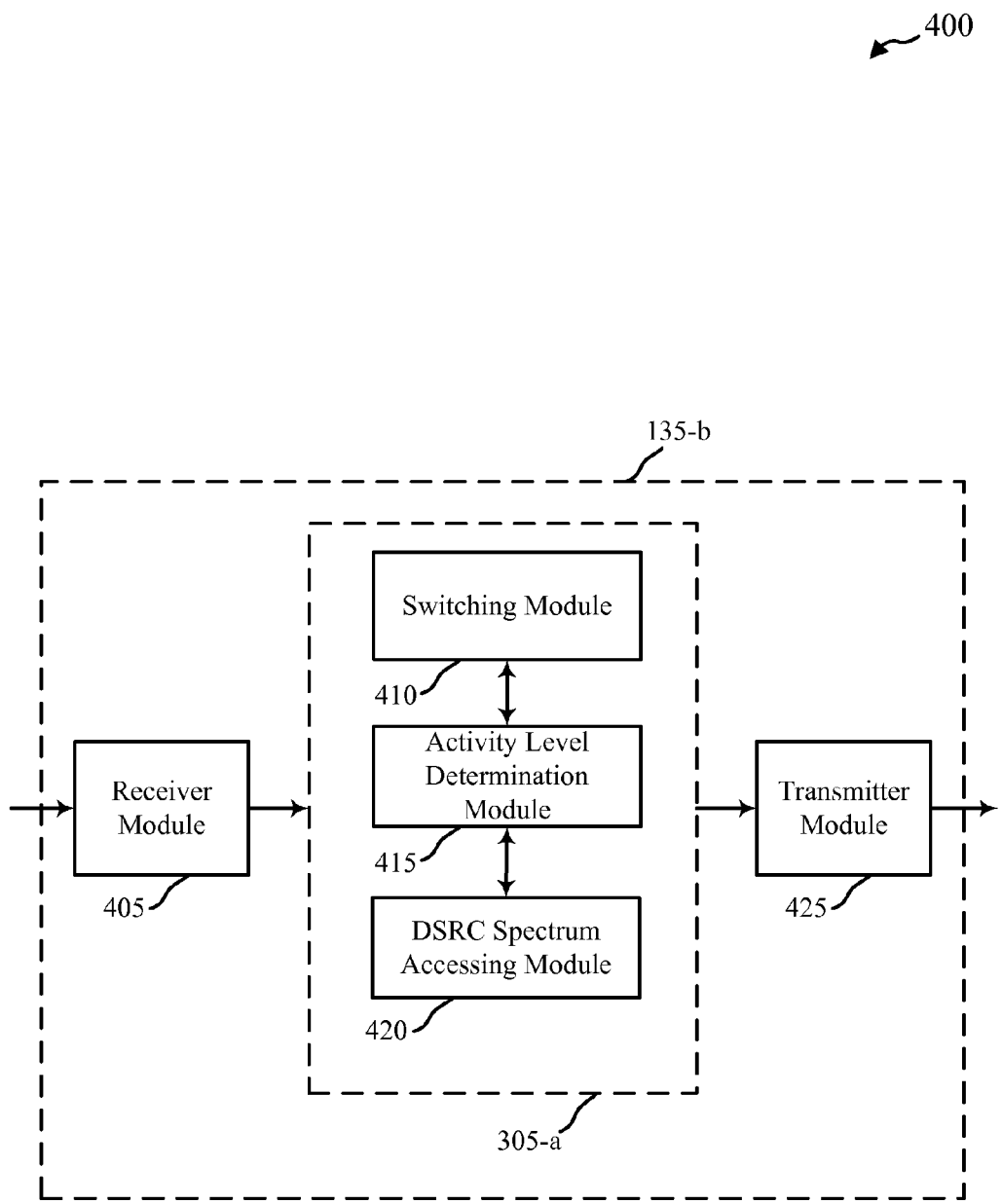
FIG. 4 shows a block diagram illustrating another example of a multi-mode device in accordance with various embodiments.

FIG. 4 is a block diagram 400 illustrating an example of a device 135-b that may detect DSRC transmissions to determine whether to use at least a portion of the DSRC spectrum. The device 135-b may be an example of one or more aspects of the multi-mode devices 135 described with reference to FIGS. 1 and/or 3. The device 135-b may include a receiver module 405, a DSRC spectrum management module 305-a, and/or a transmitter module 425. Each of these components may be in communication with each other.

The components of the device 135-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405 may include a Wi-Fi receiver and may receive various Wi-Fi signals. The receiver module 405 may also include a cellular receiver, and in some cases may include an LTE/LTE-A receiver. The receiver module 405 may be used to receive various types of data and/or control signals over a wireless communications system, such as the wireless communications system 100 described with reference to FIG. 1. The receiver module 405 may be further configured to receive data and/or control signals using at least a portion of the DSRC spectrum.

The transmitter module 425 may also include a Wi-Fi transmitter. The Wi-Fi transmitter may be capable of transmitting signals over a Wi-Fi connection. The transmitter module 425 may also include a cellular transmitter, and in some cases may include an LTE/LTE-A transmitter. The transmitter module 425 may be used to transmit various types of data and/or control signals over a wireless communications system such as the wireless communications system 100. The transmitter module 425 may be further configured to transmit data and/or control signals using at least a portion of the DSRC spectrum.

In some embodiments, the receiver module 405 and the transmitter module 425 may be sub-modules of one or more of the transceiver module(s) 330 described with reference to FIG. 3.

The DSRC spectrum management module 305-a may be an example of one or more aspects of the DSRC spectrum management module 305 described with reference to FIG. 3. In some embodiments, the module 305-a may include a switching module 410, an activity level determination module 415, and/or a DSRC spectrum accessing module 420. The switching module 410 may be used to switch operation of the device 135-b between a first clock rate and a second clock rate. In some embodiments, the first clock rate may be a 20, 40, 80, or 160 MHz Wi-Fi clock rate, and the second clock rate may be a 10 MHz DSRC clock rate. Thus, in scenarios where the device 135-b is operating at a base Wi-Fi clock rate of 20 MHz, the second clock rate would be half the first clock rate.

Initially, the device 135-b may be operated at the first clock rate, outside of the DSRC spectrum. The device 135-b may then be temporarily switched to the second clock rate under certain conditions. For example, in some cases, and by way of example, the device 135-b may be switched to the second clock rate when it has a need to use the DSRC spectrum. In other cases, and by way of further example, the device 135-e may be switched to the second clock rate after commencing operation in the DSRC spectrum, to detect DSRC transmissions and ensure that the device's use of the DSRC spectrum is not conflicting with use of the DSRC spectrum by DSRC devices. In some embodiments, the device 135-b may be switched to operate at the second clock rate for a predetermined period of time. Upon expiration of the predetermined period of time, the device 135 may be switched back to the first clock rate.

The activity level determination module 415 may be used to detect DSRC transmissions and determine whether an activity level of the detected DSRC transmissions exceeds a threshold.

The DSRC spectrum accessing module 420 may determine whether the device 135-b is allowed to use at least a portion of the DSRC spectrum and provide access to the DSRC spectrum. Upon determining that the activity level of the detected DSRC transmissions fails to exceed the threshold, the module 420 may 1) instruct the switching module 410 to switch the device 135-b back to the first clock rate, and 2) allow the device 135-b to operate in at least a portion of the DSRC spectrum. However, upon determining that the activity level of the detected DSRC transmissions exceeds the threshold, the module 420 may 1) instruct the switching module 410 to switch the device 135-b back to the first clock rate, and 2) ensure that the device 135-b continues to operate outside of the DSRC spectrum (e.g., prevent access to the DSRC spectrum).

Figure 5:
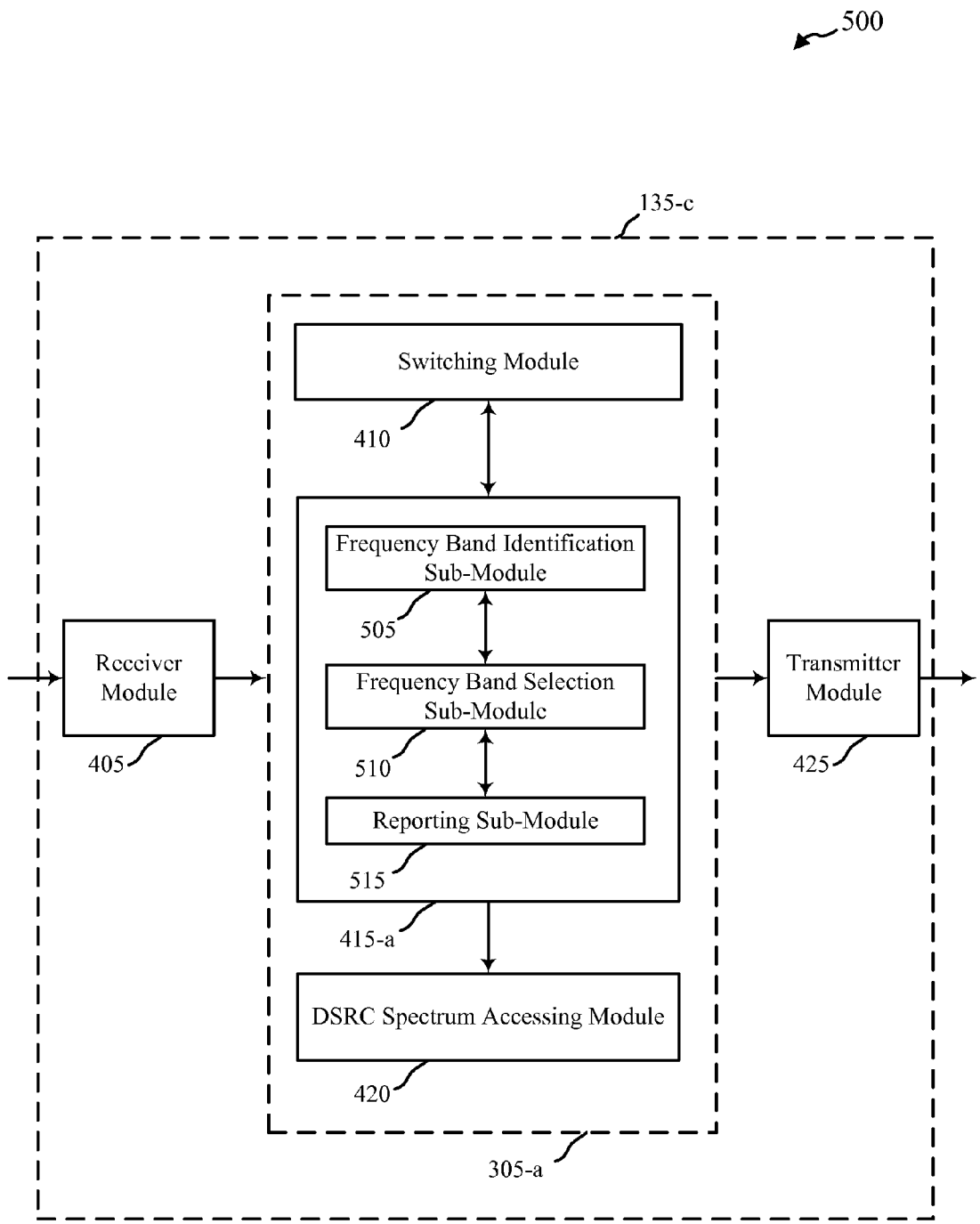
FIG. 5 is a block diagram illustrating yet another example of a multi-mode device in accordance with various embodiments.

FIG. 5 is a block diagram 500 illustrating an example of a device 135-c that may determine whether to use at least a portion of the DSRC spectrum. The device 135-c may be an example of one or more aspects of the multi-mode devices 135 described with reference to FIGS. 1, 3, and/or 4. The device 135-c may include a receiver module 405, a DSRC spectrum management module 305-b, and/or a transmitter module 425. Each of these components may be in communication with each other.

The components of the device 135-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the receiver module 405 and the transmitter module 425 may be configured to operate as previously described with reference to FIG. 4. The DSRC spectrum management module 305-b may include a switching module 410, an activity level determination module 415-a, and/or a DSRC spectrum accessing module 420. Each of these components may be an example of one or more aspects of the respective switching module 410, activity level determination module 415, and DSRC spectrum accessing module 420 described with reference to FIG. 4.

The activity level determination module 415-a may include a frequency band identification sub-module 505, a frequency band selection sub-module 510, and/or a reporting sub-module 515. The frequency band identification sub-module 505 may be used to identify and/or monitor one or more frequency bands within the DSRC spectrum while the device 135-c operates at the second clock rate.

The frequency band selection sub-module 510 may be used to select ones of the frequency bands monitored by the sub-module 505, so that the activity level determination module 415-a may determine an activity level of any transmissions on the monitored frequency band.

The reporting sub-module 515 may be used to report the occurrence of one or more detected DSRC transmissions to an access point such as one of the access points 125 described with reference to FIG. 1.

In some cases, the DSRC spectrum accessing module 420 may itself determine whether the device 135-c is allowed to use at least a portion of the DSRC spectrum and provide access to the DSRC spectrum. In other cases, the DSRC spectrum accessing module 420 may receive instructions from an access point 125 to which a report of the occurrences of one or more detected DSRC transmissions was sent. The instructions may be based at least in part on the reported occurrences of the DSRC transmissions and may indicate to the DSRC spectrum accessing module 420 whether at least a portion of the DSRC spectrum may be accessed. When the instructions indicate that at least a portion of the DSRC spectrum may be accessed, the DSRC spectrum accessing module 420 may establish a communication channel that enables the device 135-c to operate in at least the portion of the DSRC spectrum.

Figure 6:
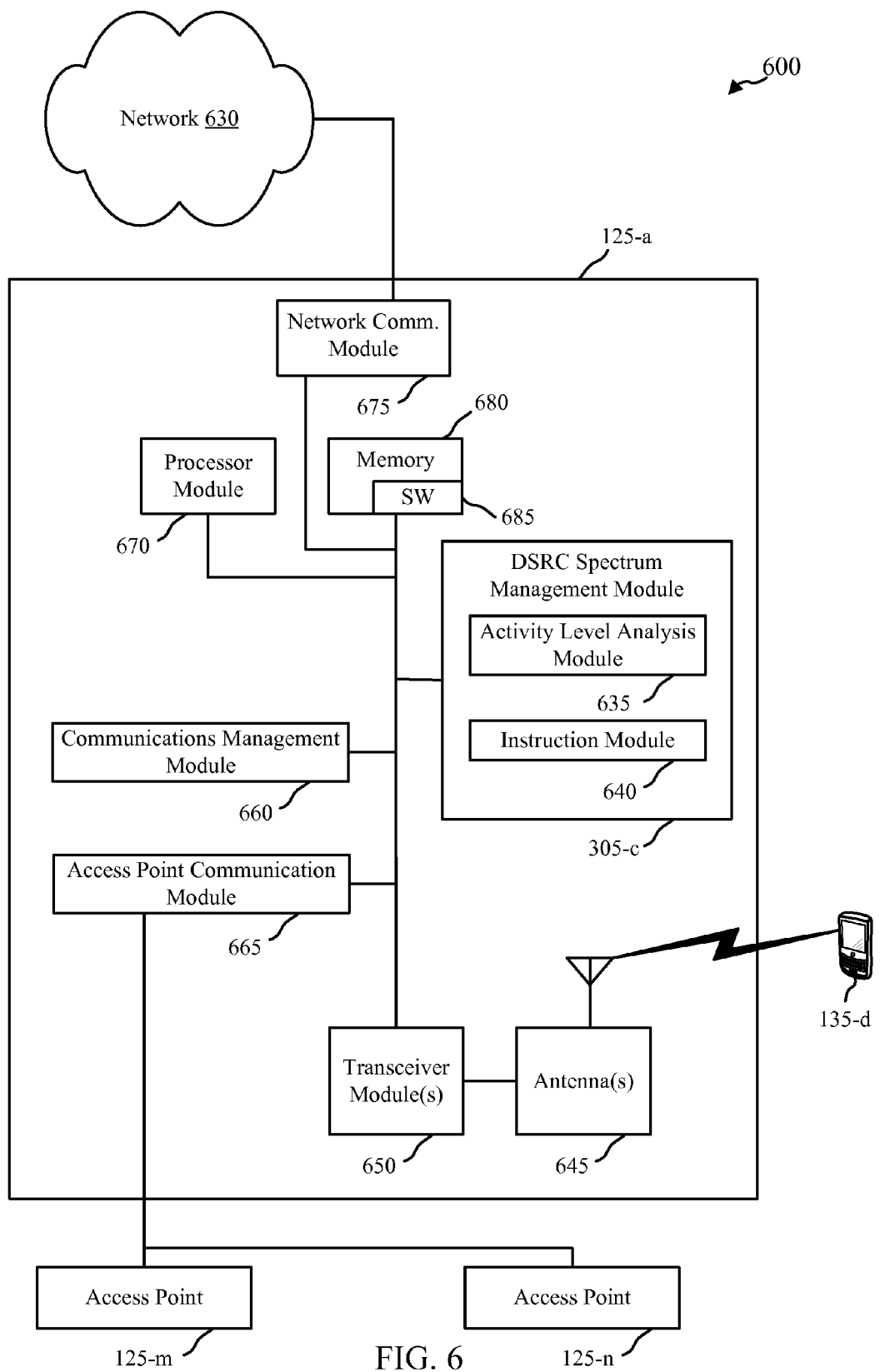
FIG. 6 shows a block diagram of a communications system that may be configured for managing the use of the DSRC spectrum.

FIG. 6 shows a block diagram of a communications system 600 that may be configured for managing the use of the DSRC spectrum by a multi-mode device 135-d. This system 600 may be an example of aspects of the system 100 depicted in FIG. 1, and/or access point 125 of FIG. 1. System 600 may include an access point 125-a. The access point 125-a may include antenna(s) 645, transceiver module(s) 650, memory 680, and a processor module 670, which each may be in communication, directly or indirectly, with each other (e.g., over one or more buses). The transceiver module(s) 650 may be configured to communicate bi-directionally, via the antenna(s) 645, with the multi-mode device 135-d. The multi-mode device 135-d may be an example of the devices 135 described with reference to FIGS. 1, 3, 4, and/or 5. The transceiver module 650 (and/or other components of the access point 125-a) may also be configured to communicate bi-directionally with one or more networks 630. In some cases, the access point 125-a may communicate with the core network 630 through network communications module 675. Access point 125-a may be an example of a Wi-Fi access point, an eNodeB base station, a Home eNodeB base station, a NodeB base station, and/or a Home NodeB base station.

Access point 125-a may also communicate with other access points 125, such as access point 125-m and access point 125-n. Each of the access points 125 may communicate with multi-mode device 135-d using different wireless communications technologies, such as different Radio Access Technologies. In some cases, access point 125-a may communicate with other access points such as 125-m and/or 125-n utilizing access point communication module 665. In some embodiments, access point communication module 665 may provide an interface within a wireless communication technology to provide communication between some of the access points 125. In some embodiments, access point 125-a may communicate with other access points through the core network 630.

The memory 680 may include random access memory (RAM) and read-only memory (ROM). The memory 680 may also store computer-readable, computer-executable software code 685 containing instructions that are configured to, when executed, cause the processor module 670 to perform various functions described herein (e.g., DSRC spectrum management). Alternatively, the software code 685 may not be directly executable by the processor module 670 but be configured to cause the computer, e.g., when compiled and executed, to perform functions described herein.

The processor module 670 may include an intelligent hardware device, e.g., a central processing unit (CPU), a microcontroller, an application-specific integrated circuit (ASIC), etc. The transceiver module 650 may include a modem configured to modulate the packets and provide the modulated packets to the antenna(s) 645 for transmission, and to demodulate packets received from the antenna(s) 645.

According to the architecture of FIG. 6, the access point 125-a may further include a communications management module 660. The communications management module 660 may manage communications with other access points 125. By way of example, the communications management module 660 may be a component of the access point 125-a in communication with some or all of the other components of the access point 125-a via a bus. Alternatively, functionality of the communications management module 660 may be implemented as a component of the transceiver module 650, as a computer program product, and/or as one or more controller elements of the processor module 670.

In one example, the access point 125-a may include a DSRC spectrum management module 305-c. By way of example, the DSRC spectrum management module 305-c may be a component of the access point 125-a in communication with some or all of the other components of the access point 125-a via a bus. Alternatively, functionality of the DSRC spectrum management module 305-c may be implemented as a computer program product, and/or as one or more controller elements of the processor module 670. The module 305-c may include an activity level analysis module 635 and an instruction module 640. In one embodiment, the access point 125-a may receive one or more reports from the device 135-d and/or other devices. Each report may disclose the occurrence of one or more detected DSRC transmissions. The activity level analysis module 635 may analyze the report(s) to determine whether the activity level of detected DSRC transmissions exceed a threshold. In some embodiments, the analysis may be performed for each of a number of frequency bands of the DSRC spectrum. Then, based on the analysis conducted by the activity level analysis module 635, the instruction module 640 may formulate one or more instructions for transmission to the device 135-d. The instructions may indicate whether the device 135-d may operate in the DSRC spectrum and/or which frequency bands of the DSRC spectrum may be used by the device 135-d. Instructions based on the same report or reports may also be transmitted to other devices 135.

In some embodiments, the transceiver module(s) 650 in conjunction with antenna(s) 645, along with other possible components of access point 125-a, may transmit the instructions to the multi-mode device 135-d. As previously described, the instructions may indicate whether the device 135-d is allowed to operate in the DSRC spectrum.

Figure 7:
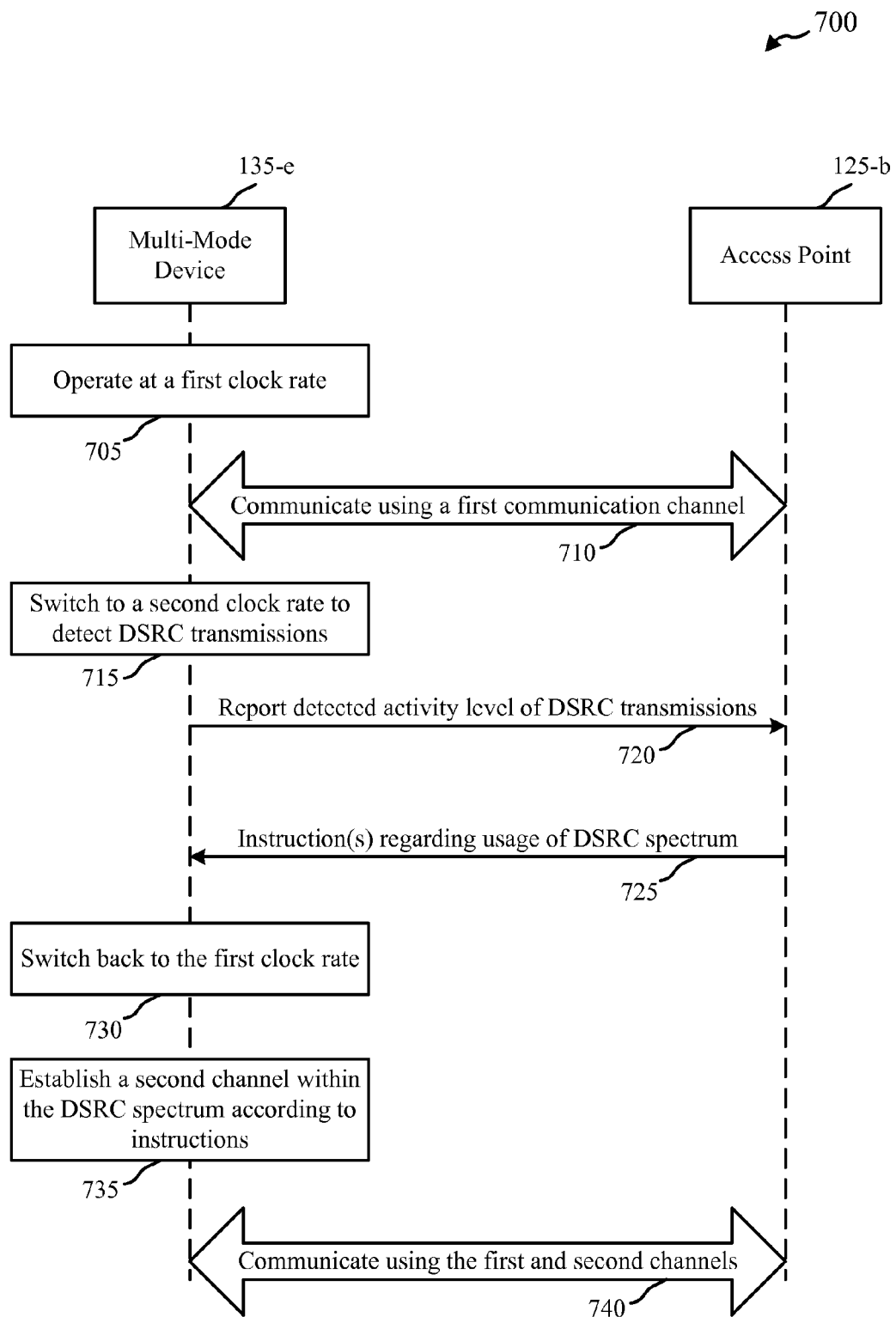
FIG. 7 is a message flow diagram illustrating one example of communications between a multi-mode device and an access point to manage use of the DSRC spectrum.

FIG. 7 is a message flow diagram 700 illustrating one example of communications between a multi-mode device 135-e and an access point 125-b. The multi-mode device 135-e may be an example of aspects of one or more of the multi-mode devices 135 described with reference to FIGS. 1, 3, 4, and/or 5. The access point 125-b may be an example of aspects of one or more of the access points 125 described with reference to FIGS. 1 and/or 6. In some embodiments, the functions of the access point 125-b may be performed by another multi-mode device 135.

The message flow may begin at block 705, with the multi-mode device 135-e operating outside of the DSRC spectrum using a first clock rate. In some embodiments, the first clock rate may be a 20, 40, 80, or 160 MHz Wi-Fi clock rate. While operating at the first clock rate, the multi-mode device 135-e may communicate with the access point 125-b using a first communication channel 710.

At block 715, and while operating outside the of the DSRC spectrum, the multi-mode device 135-e may switch to a second clock rate to detect DSRC transmissions using the DSRC spectrum. In some embodiments, the second clock rate may be a 10 MHz DSRC clock rate. In some cases, and by way of example, the multi-mode device 135-e may switch to the second clock rate and attempt to detect DSRC transmissions because it has a need to use the DSRC spectrum, but first needs to make sure the DSRC spectrum is not being used by DSRC devices. In other cases, and by way of further example, the multi-mode device 135-e may switch to the second clock rate and attempt to detect DSRC transmissions because it is already using the DSRC spectrum and should make sure its use of the DSRC spectrum is not conflicting with the use of the DSRC spectrum by DSRC devices (in which case the multi-mode device 135-e should stop using the DSRC spectrum).

The multi-mode device 135-e may report an occurrence of one or more detected DSRC transmissions to the access point 125-b in a number of (i.e., one or more) messages 720. The multi-mode device 135-e may then receive at least one instruction 725 from the access point 125-b. The at least one instruction 725 may be based at least in part on the reported occurrence of the detected DSRC transmissions.

Based at least in part on the at least one instruction 725 received from the access point 125-b, the multi-mode device 135-e may determine that it is allowed to operate in at least a portion of the DSRC spectrum. The multi-mode device 135-e may then switch back to the first clock rate at block 730, and establish a second communication channel with the access point 125-b at block 735. The multi-mode device 135-e may then communication with the access point 125-b over the first and/or second communication channel 710, 740. The bandwidth of the second communication channel may include at least a portion of the DSRC spectrum. The bandwidth of the second communication channel may also include a portion of the spectrum that is outside of the DSRC spectrum.

Figure 8:
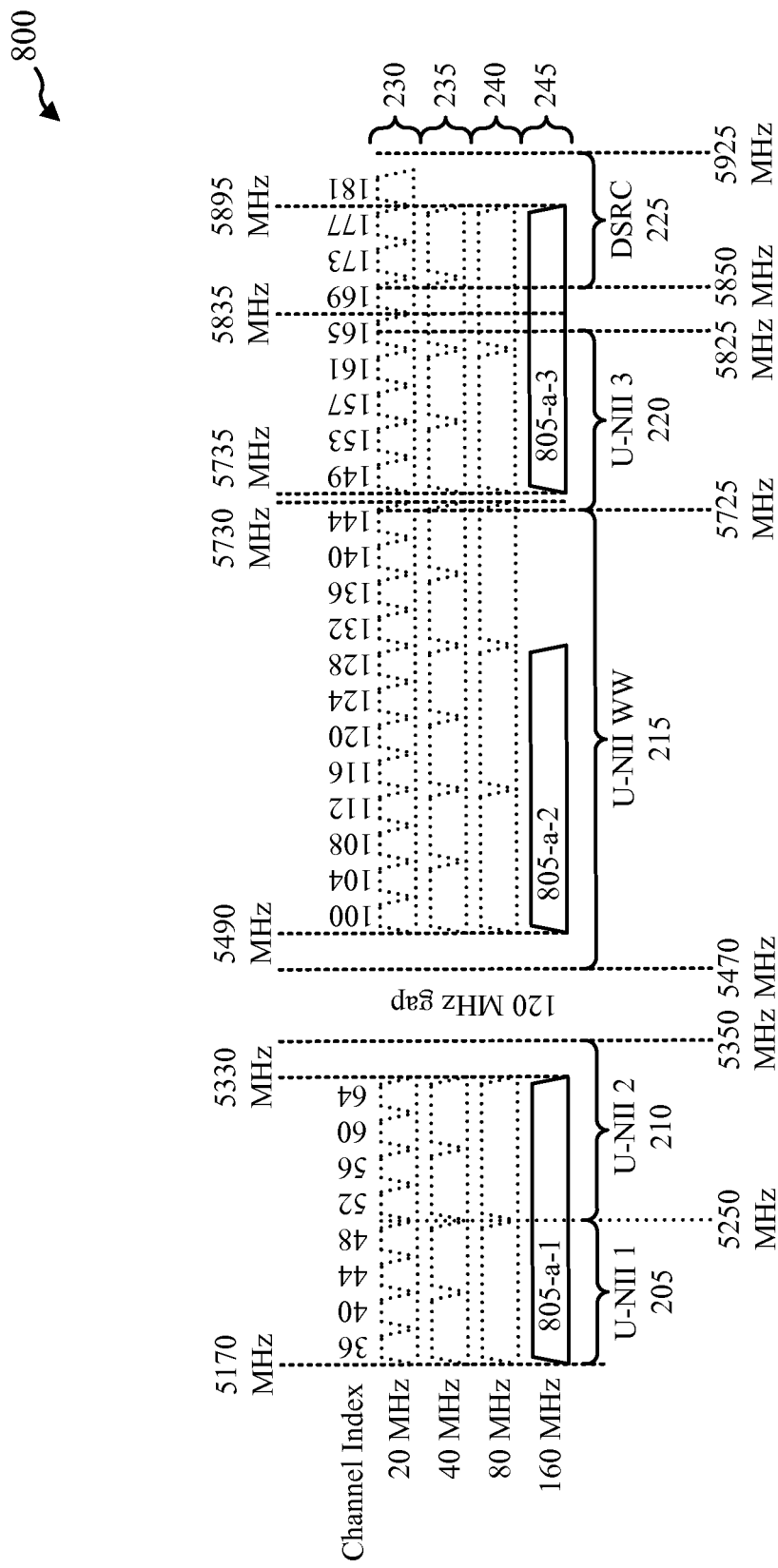
FIG. 8 is a diagram illustrating allocations bandwidth for various frequency bands along a frequency spectrum that may be used for communications.

FIG. 8 shows an exemplary view of various spectrum allocations in the 5 GHz spectrum 800 and the use of the DSRC spectrum by a multi-mode device 135. As previously described, the spectrum 800 may include different allocations of frequency bands along the spectrum 800. In one configuration, each frequency band allocation may use a certain number of frequency channels. Each channel may occupy a certain amount of bandwidth. As illustrated, the U-NII 1 frequency band 205 may support up to four 20 MHz channels 230, two 40 MHz channels 235, or one 80 MHz channel 240. Similarly, the U-NII 2 frequency band 210 may support up to four 20 MHz channels 230, two 40 MHz channels 235, or one 80 MHz channel 240. As previously stated, neither the U-NII 1 frequency band 205 nor the U-NII 2 frequency band 210 may individually support a 160 MHz channel 805-a-1. However, since a multi-mode device 135 may operate across both bands 205, 210, the device may effectively use the 160 MHz channel across both frequency bands.

As further illustrated, the U-NII WW band 215 may support a 160 MHz channel 805-a-2. A 160 MHz channel 805-a-3 may also be supported across the bands for the U-NII 3 frequency band 220 and the DSRC frequency band 225. In one embodiment, when a multi-mode device 135 determines that it is located in an area where use of the DSRC spectrum is permitted, it may use at least a portion DSRC spectrum 225. As a result, the bandwidth for the transmissions of the device 135 may be increased as the device may operate on the 160 MHz channel 805-a-1 across the U-NII 1 205 and U-NII 2 210 bands, the 160 MHZ channel 805-a-2 in the U-NII WW band 215, as well as the 160 MHz channel 805-a-3 across the U-NII 3 spectrum 220 and the DSRC spectrum 225. This increase in bandwidth for the multi-mode device's 135 transmissions may enable increased data rates, which may allow for higher throughput.

Figure 9:
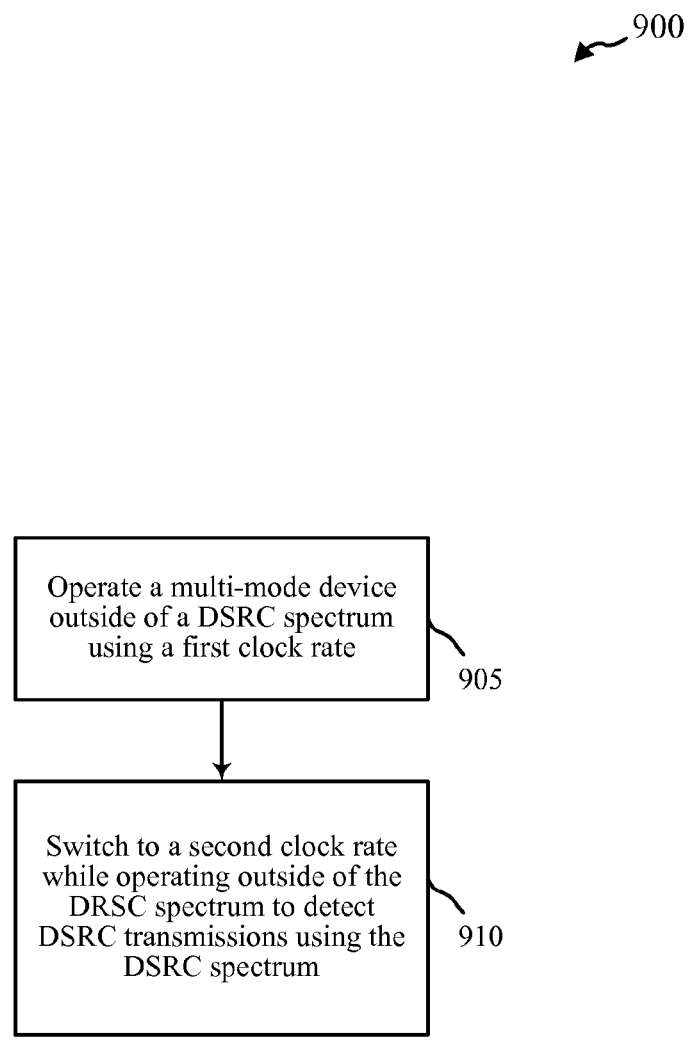
FIG. 9 is a flow chart illustrating one embodiment of a method for detecting DSRC transmissions to determine whether to use at least a portion of the DSRC spectrum.

FIG. 9 is a flow chart illustrating one embodiment of a method 900 for detecting DSRC transmissions to determine whether to use at least a portion of the DSRC spectrum. For clarity, the method 900 is described below with reference to aspects of one or more of the multi-mode devices 135 described with reference to FIGS. 1, 3, 4, and/or 5. In one implementation, the DSRC spectrum management module 305 described with reference to FIGS. 3, 4, and/or 5 may execute one or more sets of codes to control the functional elements of a multi-mode device 135 to perform the functions described below.

At block 905, a multi-mode device 135 may be operated outside of the DSRC spectrum using a first clock rate. By way of example, the multi-mode device 135 may be operated in a spectrum outside of the DSRC spectrum by operating the multi-mode device 135 in a spectrum adjacent the DSRC spectrum, such as a Wi-Fi spectrum. In some embodiments, the first clock rate may be a 20, 40, 80, or 160 MHz Wi-Fi clock rate. In some embodiments, the DSRC spectrum management module 305 described with reference to FIGS. 3, 4, and/or 5 may be used to operate the multi-mode device 135 outside of the DSRC spectrum.

At block 910, the multi-mode device 135 may be switched to a second clock rate while operating outside of the DSRC spectrum. The multi-mode device 135 may be switched to the second clock rate to detect DSRC transmissions using the DSRC spectrum. In some embodiments, the second clock rate may be a 10 MHz DSRC clock rate (or half the first clock rate when the first clock rate is the Wi-FI base clock rate of 20 MHz).

In some cases, and by way of example, the multi-mode device 135 may switch to the second clock rate and attempt to detect DSRC transmissions because it has a need to use the DSRC spectrum, but first needs to make sure the DSRC spectrum is not being used by DSRC devices. In other cases, and by way of further example, the multi-mode device 135 may switch to the second clock rate and attempt to detect DSRC transmissions because it is already using the DSRC spectrum and should make sure its use of the DSRC spectrum is not conflicting with the use of the DSRC spectrum by DSRC devices (in which case the multi-mode device 135 should stop using the DSRC spectrum).

In some embodiments, the operations at block 910 may be performed using the switching module 410 described with reference to FIGS. 4 and/or 5.

The multi-mode device 135 may in some cases operate at the second clock rate for a predetermined period of time. Upon expiration of the predetermined period of time, the multi-mode device may switch back to the first clock rate. The method 900 may then be repeated.

Therefore, the method 900 may be used for detecting DSRC transmissions to determine whether to use at least a portion of the DSRC spectrum. It should be noted that the method 900 is just one implementation and that the operations of the method 900 may be rearranged or otherwise modified such that other implementations are possible.

Figure 10:
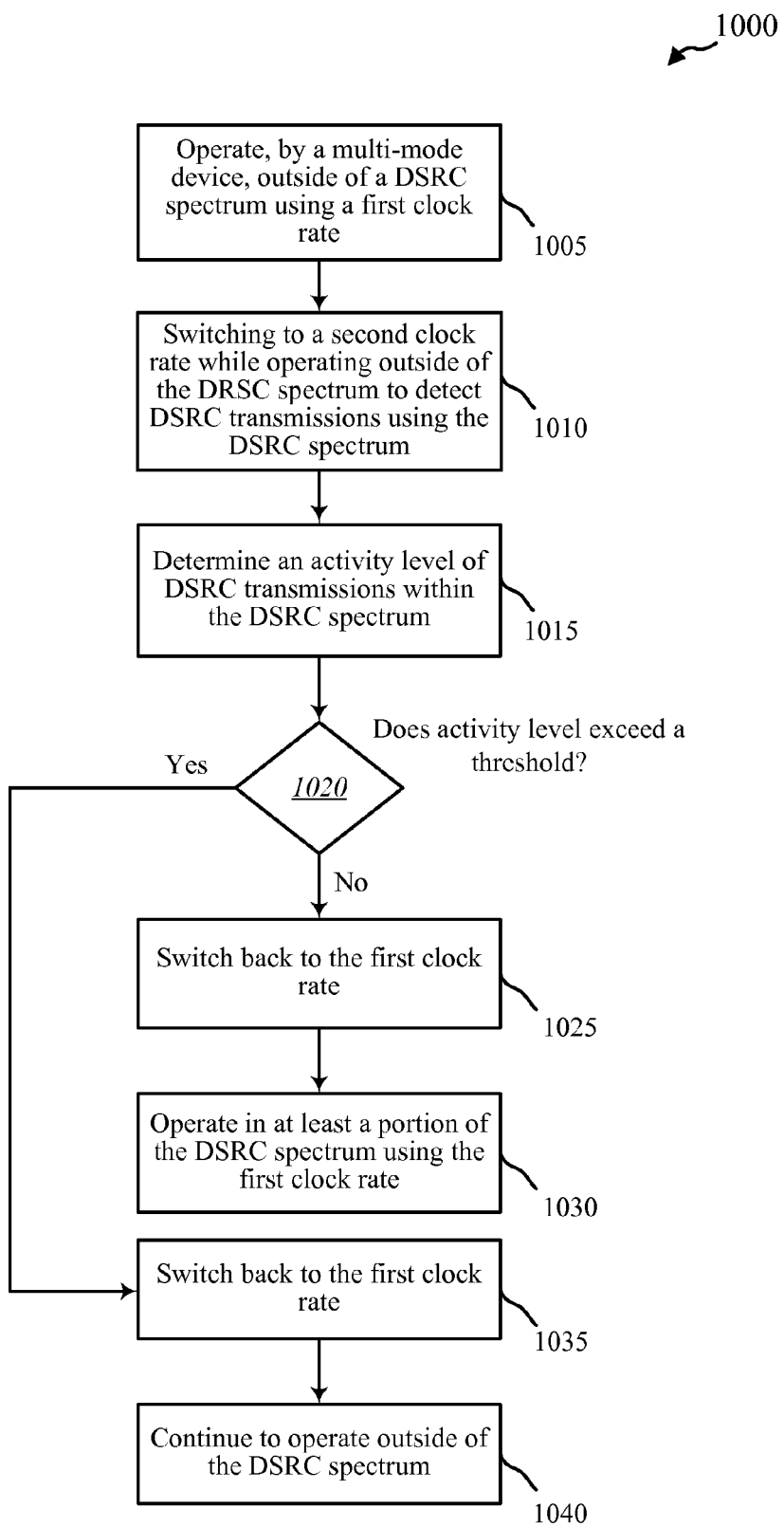
FIG. 10 is a flow chart illustrating another embodiment of a method for detecting DSRC transmissions to determine whether to use at least a portion of the DSRC spectrum.

FIG. 10 is a flow chart illustrating another embodiment of a method 1000 for detecting DSRC transmissions to determine whether to use at least a portion of the DSRC spectrum. For clarity, the method 1000 is described below with reference to aspects of one or more of the multi-mode devices 135 described with reference to FIGS. 1, 3, 4, and/or 5. In one implementation, the DSRC spectrum management module 305 described with reference to FIGS. 3, 4, and/or 5 may execute one or more sets of codes to control the functional elements of a multi-mode device 135 to perform the functions described below.

At block 1005, a multi-mode device 135 may be operated outside of the DSRC spectrum using a first clock rate. By way of example, the multi-mode device 135 may be operated in a spectrum outside of the DSRC spectrum by operating the multi-mode device 135 in a spectrum adjacent the DSRC spectrum, such as a Wi-Fi spectrum. In some embodiments, the first clock rate may be a 20, 40, 80, or 160 MHz Wi-Fi clock rate. In some embodiments, the DSRC spectrum management module 305 described with reference to FIGS. 3, 4, and/or 5 may be used to operate the multi-mode device 135 outside of the DSRC spectrum.

At block 1010, the multi-mode device 135 may be switched to a second clock rate while operating outside of the DSRC spectrum. The multi-mode device 135 may be switched to the second clock rate to detect DSRC transmissions using the DSRC spectrum. In some embodiments, the second clock rate may be a 10 MHz DSRC clock rate (or half the first clock rate when the first clock rate is the Wi-FI base clock rate of 20 MHz).

In some cases, and by way of example, the multi-mode device 135 may switch to the second clock rate and attempt to detect DSRC transmissions because it has a need to use the DSRC spectrum, but first needs to make sure the DSRC spectrum is not being used by DSRC devices. In other cases, and by way of further example, the multi-mode device 135 may switch to the second clock rate and attempt to detect DSRC transmissions because it is already using the DSRC spectrum and should make sure its use of the DSRC spectrum is not conflicting with the use of the DSRC spectrum by DSRC devices (in which case the multi-mode device 135 should stop using the DSRC spectrum).

In some embodiments, the operations at block 1010 may be performed using the switching module 410 described with reference to FIGS. 4 and/or 5.

At block 1015, an activity level of the detected DSRC transmissions may be determined, and at block 1020, it may be determined whether the activity level of the detected DSRC transmissions exceeds a threshold. In some embodiments, the detected DSRC transmissions are used when comparing to a threshold. In some embodiments, the operations at blocks 1015 and 1020 may be performed using the activity level determination module 415 described with reference to FIG. 4.

Upon determining that the activity level of the detected DSRC transmissions, or the detected DSRC transmissions, fail(s) to exceed the threshold, the multi-mode device 135 may switch back to the first clock rate at block 1025 and begin operating in at least a portion of the DSRC spectrum at block 1030. In some cases, the multi-mode device 135 may be operated in at least the portion of the DSRC spectrum at the first clock rate. In other cases, the multi-mode device 135 may be operated in at least the portion of the DSRC spectrum at a clock rate other than the first clock rate. In some embodiments, the operations at block 1025 may be performed using the switching module 410, and the operations at block 1030 may be performed using the DSRC spectrum accessing module 420.

In some cases, operating in at least the portion of the DSRC spectrum may include establishing a communication channel having a bandwidth that includes at least the portion of the DSRC spectrum. The bandwidth of the newly established communication channel may also include a portion of the frequency spectrum that is outside of the DSRC spectrum. While communicating with an access point 125 or another multi-mode device using the newly established communication channel, the multi-mode device 135 may in some cases also communicate over a communication channel having a bandwidth that is entirely outside of the DSRC spectrum. By maintaining such a communication channel outside of the DSRC spectrum, the multi-mode device 135 may be able to more readily cease use of the communication channel that uses at least the portion of the DSRC spectrum (e.g., in cases where the activity level in the DSRC spectrum rises and the multi-mode device 135 determines that it should cede use of the DSRC spectrum to DSRC devices).

Upon determining that the activity level of the detected DSRC transmissions exceeds the threshold, the multi-mode device 135 may switch back to the first clock rate at block 1035 and continue operating outside of the DSRC spectrum at block 1040. In some cases, the multi-mode device 135 may continue operating outside of the DSRC spectrum for a predetermined time. After expiration of the predetermined time, the multi-mode device 135 may repeat the method 1000 beginning at block 1010. In some embodiments, the operations at block 1035 may be performed using the switching module 410 described with reference to FIG. 4.

Therefore, the method 1000 may be used for detecting DSRC transmissions to determine whether to use at least a portion of the DSRC spectrum. It should be noted that the method 1000 is just one implementation and that the operations of the method 1000 may be rearranged or otherwise modified such that other implementations are possible.

Figure 11:
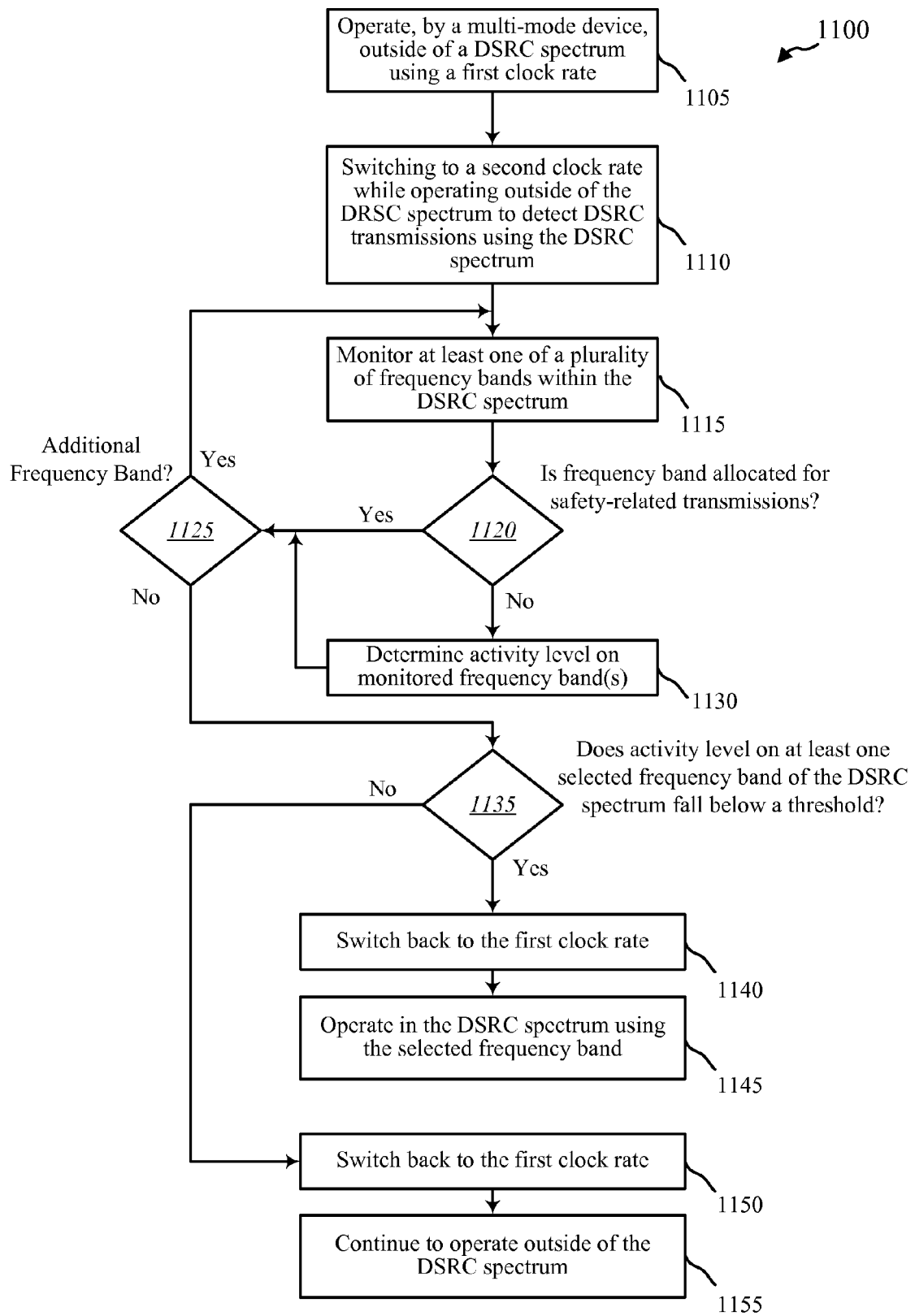
FIG. 11 is a flow chart illustrating a further embodiment of a method for detecting DSRC transmissions to determine whether to use at least a portion of the DSRC spectrum.

FIG. 11 is a flow chart illustrating yet another embodiment of a method 1100 for detecting DSRC transmissions to determine whether to use at least a portion of the DSRC spectrum. For clarity, the method 1100 is described below with reference to aspects of one or more of the multi-mode devices 135 described with reference to FIGS. 1, 3, 4, and/or 5. In one implementation, the DSRC spectrum management module 305 described with reference to FIGS. 3, 4, and/or 5 may execute one or more sets of codes to control the functional elements of a multi-mode device 135 to perform the functions described below.

At block 1105, a multi-mode device 135 may be operated outside of the DSRC spectrum using a first clock rate. By way of example, the multi-mode device 135 may be operated in a spectrum outside of the DSRC spectrum by operating the multi-mode device 135 in a spectrum adjacent the DSRC spectrum, such as a Wi-Fi spectrum. In some embodiments, the first clock rate may be a 20, 40, 80, or 160 MHz Wi-Fi clock rate. In some embodiments, the DSRC spectrum management module 305 described with reference to FIGS. 3, 4, and/or 5 may be used to operate the multi-mode device 135 outside of the DSRC spectrum.

At block 1110, the multi-mode device 135 may be switched to a second clock rate while operating outside of the DSRC spectrum. The multi-mode device 135 may be switched to the second clock rate to detect DSRC transmissions using the DSRC spectrum. In some embodiments, the second clock rate may be a 10 MHz DSRC clock rate (or half the first clock rate when the first clock rate is the Wi-FI base clock rate of 20 MHz).

In some cases, and by way of example, the multi-mode device 135 may switch to the second clock rate and attempt to detect DSRC transmissions because it has a need to use the DSRC spectrum, but first needs to make sure the DSRC spectrum is not being used by DSRC devices. In other cases, and by way of further example, the multi-mode device 135 may switch to the second clock rate and attempt to detect DSRC transmissions because it is already using the DSRC spectrum and should make sure its use of the DSRC spectrum is not conflicting with the use of the DSRC spectrum by DSRC devices (in which case the multi-mode device 135 should stop using the DSRC spectrum).

In some embodiments, the operations at block 1110 may be performed by the switching module 410 described with reference to FIGS. 4 and/or 5.

At block 1115, at least one of a plurality of frequency bands within the DSRC spectrum may be monitored while operating at the second clock rate. In some embodiments, the operations at block 1115 may be performed using the frequency band monitoring sub-module 505 described with reference to FIG. 5.

At block 1120, it may be determined whether the monitored frequency band is allocated for safety-related transmissions in the DSRC spectrum. If so, the frequency band may be avoided as a candidate for use by the multi-mode device 135, and an additional frequency band, if any, may be identified at block 1125. If an additional frequency band is identified, flow of the method 1100 may return to block 1115. However, if all frequency bands in the DSRC spectrum have been processed, flow of the method 1100 may continue to block 1135.

At block 1130, the activity level of transmissions on the monitored frequency band(s) may be determined. Flow of the method 1100 then continues to block 1125, where it may be determined whether an additional frequency band in the DSRC spectrum needs to be monitored for the purpose of determining its activity level.

After determining that all of the frequency bands in the DSRC spectrum have been monitored for the purpose of determining their activity levels, flow of the method 1100 may continue to block 1135. At block 1135, it may be determined whether the activity level on at least one selected frequency band of the DSRC spectrum falls below a threshold. In some cases, at least one detected DSRC transmission may be used when comparing to a threshold. In some embodiments, the operations at blocks 1120, 1125, and 1135 may be performed using the frequency band activity level determination sub-module 510 described with reference to FIG. 5.

Upon determining that the activity level on at least one selected frequency band of the DSRC spectrum, or at least one detected DSRC transmission, fall(s) below a threshold, the multi-mode device 135 may switch back to the first clock rate at block 1140, and at block 1145 the multi-mode device 135 may begin operating in the DSRC spectrum using the at least one selected frequency band. In some cases, the multi-mode device 135 may be operated in DSRC spectrum at the first clock rate. In other cases, the multi-mode device 135 may be operated in the DSRC spectrum at a clock rate other than the first clock rate. In some embodiments, the operations at block 1140 may be performed using the switching module 410, and the operations at block 1145 may be performed using the DSRC spectrum accessing module 420.

In some cases, operating in at least the portion of the DSRC spectrum may include establishing a communication channel having a bandwidth that includes at least the selected frequency band(s) of the DSRC spectrum. The bandwidth of the newly established communication channel may also include a portion of the frequency spectrum that is outside of the DSRC spectrum. While communicating with an access point 125 or another multi-mode device using the newly established communication channel, the multi-mode device 135 may in some cases also communicate over a communication channel having a bandwidth that is entirely outside of the DSRC spectrum. By maintaining such a communication channel outside of the DSRC spectrum, the multi-mode device 135 may be able to more readily cease use of the communication channel that uses the selected frequency band(s) of the DSRC spectrum (e.g., in cases where the activity level in the DSRC spectrum rises and the multi-mode device 135 determines that it should cede use of the DSRC spectrum to DSRC devices).

Upon determining at block 1135 that the activity level on all frequency bands of the DSRC spectrum is above the threshold, the multi-mode device 135 may switch back to the first clock rate at block 1150 and continue operating outside of the DSRC spectrum at block 1155. In some cases, the multi-mode device 135 may continue operating outside of the DSRC spectrum for a predetermined time. After expiration of the predetermined time, the multi-mode device 135 may repeat the method 1100 beginning at block 1110. In some embodiments, the operations at block 1150 may be performed using the switching module 410 described with reference to FIGS. 4 and/or 5.

Therefore, the method 1100 may be used for detecting DSRC transmissions to determine whether to use at least a portion of the DSRC spectrum. It should be noted that the method 1100 is just one implementation and that the operations of the method 1100 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for detecting dedicated short range communications (DSRC) transmissions to determine whether to use at least a portion of the DSRC spectrum, comprising:
    operating, by a multi-mode client device, outside of the DSRC spectrum using a first clock rate;
    switching to a second clock rate while operating outside of the DSRC spectrum to detect DSRC transmissions using the DSRC spectrum;
    determining an activity level in the DSRC spectrum;
    operating a first communication channel in at least a portion of the DSRC spectrum based at least in part on the activity level; and
    maintaining a second communication channel outside of the DSRC spectrum in conjunction with the first communication channel.

2. The method of claim 1, further comprising:
    determining whether the activity level exceeds a threshold.

3. The method of claim 2, further comprising:
    upon determining that the activity level fails to exceed the threshold, switching to the first clock rate for operating in at least the portion of the DSRC spectrum.

4. The method of claim 2, further comprising:
    upon determining that the activity level exceeds the threshold, switching to the first clock rate for continuing to operate outside of the DSRC spectrum for a predetermined period of time.

5. The method of claim 1, further comprising:
    operating at the second clock rate for a predetermined period of time; and
    upon an expiration of the predetermined period of time, switching to the first clock rate.

6. The method of claim 1, further comprising:
    reporting an occurrence of one or more detected DSRC transmissions to an access point (AP); and
    receiving instructions from the AP, the instructions based at least in part on the reported occurrences of the DSRC transmissions; and
    wherein operating the first communication channel in at least a portion of the DSRC spectrum is based at least in part on the instructions received from the AP.

7. The method of claim 1, further comprising:
    monitoring at least one of a plurality of frequency bands within the DSRC spectrum while operating at the second clock rate.

8. The method of claim 7, wherein determining the activity level comprises:
    determining the activity level of transmissions on each of the monitored frequency bands.

9. The method of claim 8, further comprising:
    switching to the first clock rate;
    selecting at least one of the monitored frequency bands; and
    operating the first communication channel in at least a portion of the DSRC spectrum using the at least one selected frequency band, the frequency band being selected based at least in part on the activity level.

10. The method of claim 9, wherein selecting at least one of the monitored frequency bands comprises:
    avoiding the selection of frequency bands allocated for safety-related transmissions in the DSRC spectrum.

11. The method of claim 1, wherein the second clock rate is half the first clock rate.

12. A multi-mode client device for detecting dedicated short range communications (DSRC) transmissions to determine whether to use at least a portion of the DSRC spectrum, comprising:
    a processor;
    memory in electronic communication with the processor; and
    instructions stored in the memory, the instructions being executable by the processor to:
    operate the multi-mode device outside of the DSRC spectrum using a first clock rate;
    switch to a second clock rate while operating outside of the DSRC spectrum to detect DSRC transmissions using the DSRC spectrum;
    determine an activity level in the DSRC spectrum;
    operate a first communication channel in at least a portion of the DSRC spectrum based at least in part on the activity level; and
    maintain a second communication channel outside of the DSRC spectrum in conjunction with the first communication channel.

13. The multi-mode device of claim 12, wherein the instructions are executable by the processor to:
    determine whether the activity level exceeds a threshold.

14. The multi-mode device of claim 13, wherein the instructions are executable by the processor to:
    upon determining that the activity level fails to exceed the threshold, switch to the first clock rate for operating in at least the portion of the DSRC spectrum.

15. The multi-mode device of claim 13, wherein the instructions are executable by the processor to:
    upon determining that the activity level exceeds the threshold, switch to the first clock rate for continuing to operate outside of the DSRC spectrum for a predetermined period of time.

16. The multi-mode device of claim 12, wherein the instructions are executable by the processor to:
    operate at the second clock rate for a predetermined period of time; and
    upon an expiration of the predetermined period of time, switch to the first clock rate.

17. The multi-mode device of claim 12, wherein the instructions are executable by the processor to:
    report an occurrence of one or more detected DSRC transmissions to an access point (AP); and
    receive instructions from the AP, the instructions based at least in part on the reported occurrences of the DSRC transmissions; and
    wherein operating the first communication channel in at least a portion of the DSRC spectrum is based at least in part on the instructions received from the AP.

18. The multi-mode device of claim 12, wherein the instructions are executable by the processor to:
    monitor at least one of a plurality of frequency bands within the DSRC spectrum while operating at the second clock rate.

19. The multi-mode device of claim 18, wherein determining the activity level comprises:
    determining the activity level of transmissions on each of the monitored frequency bands.

20. The multi-mode device of claim 19, wherein the instructions are executable by the processor to:
    switch to the first clock rate;
    select at least one of the monitored frequency bands; and
    operate the first communication channel in at least a portion of the DSRC spectrum using the at least one selected frequency band, the frequency band being selected based at least in part on the determined activity level.

21. The multi-mode device of claim 20, wherein the instructions are executable by the processor to:
avoid the selection of frequency bands allocated for safety-related transmissions in the DSRC spectrum.

22. The multi-mode device of claim 12, wherein the second clock rate is half the first clock rate.

23. A multi-mode client device for detecting dedicated short range communications (DSRC) transmissions to determine whether to use at least a portion of the DSRC spectrum, comprising:
means for operating the multi-mode device outside of the DSRC spectrum using a first clock rate;
means for switching to a second clock rate while operating outside of the DSRC spectrum to detect DSRC transmissions using the DSRC spectrum;
means for determining an activity level in the DSRC spectrum;
means for operating a first communication channel in at least a portion of the DSRC spectrum based at least in part on the activity level; and
means for maintaining a second communication channel outside of the DSRC spectrum in conjunction with the first communication channel.

24. The multi-mode device of claim 23, further comprising:
means for determining whether activity level exceeds a threshold.

25. The multi-mode device of claim 24, further comprising:
means for, upon determining that the activity level fails to exceed the threshold, switching to the first clock rate for operating in at least the portion of the DSRC spectrum.

26. The multi-mode device of claim 24, further comprising:
means for, upon determining that the activity level exceeds the threshold, switching to the first clock rate for continuing to operate outside of the DSRC spectrum for a predetermined period of time.

27. The multi-mode device of claim 23, further comprising:
means for operating at the second clock rate for a predetermined period of time; and
means for, upon an expiration of the predetermined period of time, switching to the first clock rate.

28. The multi-mode device of claim 23, further comprising:
means for reporting an occurrence of one or more detected DSRC transmissions to an access point (AP); and
means for receiving instructions from the AP, the instructions based at least in part on the reported occurrences of the DSRC transmissions; and
wherein means for operating the first communication channel in at least a portion of the DSRC spectrum is based at least in part on the instructions received from the AP.

29. The multi-mode device of claim 23, further comprising:
means for monitoring at least one of a plurality of frequency bands within the DSRC spectrum while operating at the second clock rate.

30. A computer program product for detecting dedicated short range communications (DSRC) transmissions to determine whether to use at least a portion of the DSRC spectrum, the computer program product comprising a non-transitory computer-readable medium storing instructions executable by a processor to:
operate a multi-mode client device outside of the DSRC spectrum using a first clock rate;
switch to a second clock rate while operating outside of the DSRC spectrum to detect DSRC transmissions using the DSRC spectrum;
determine an activity level in the DSRC spectrum;
operate a first communication channel in at least a portion of the DSRC spectrum based at least in part on the activity level; and
maintain a second communication channel outside of the DSRC spectrum in conjunction with the first communication channel.

* * * * *